United States Patent [19]
Talbot

[11] Patent Number: 5,546,089
[45] Date of Patent: Aug. 13, 1996

[54] OPTICAL MONOPULSE CHIRP PROCESSOR

[75] Inventor: Pierre J. Talbot, Alder Creek, N.Y.

[73] Assignee: The United States of America as represented by the Secretary of the Air Force, Washington, D.C.

[21] Appl. No.: 513,369

[22] Filed: Aug. 10, 1995

[51] Int. Cl.[6] .............................. G01S 7/292; G01S 7/34
[52] U.S. Cl. ..................... 342/159; 342/162; 342/93; 342/192
[58] Field of Search .................... 342/159, 162, 342/52, 54, 93, 192

[56] References Cited

U.S. PATENT DOCUMENTS

| | | | |
|---|---|---|---|
| 3,611,182 | 10/1971 | Treacy | 372/15 |
| 3,701,149 | 10/1972 | Patton et al. | 342/93 |
| 3,968,490 | 7/1976 | Gostin | 342/93 |
| 3,995,270 | 11/1976 | Perry et al. | 342/93 |
| 4,103,301 | 7/1978 | Evans | 342/93 |
| 4,293,856 | 10/1981 | Chressanthis et al. | 342/93 |
| 4,513,286 | 4/1985 | Irabu | 342/93 |
| 4,532,639 | 7/1985 | Price et al. | 375/343 |
| 4,586,043 | 4/1986 | Wolf | 342/93 |
| 4,608,566 | 8/1986 | Ennis et al. | 342/28 |
| 5,061,934 | 10/1991 | Brown et al. | 342/162 |

*Primary Examiner*—John B. Sotomayor
*Attorney, Agent, or Firm*—William G. Auton

[57] ABSTRACT

An optical chirp processor for the collection and processing clutter samples is presented that allows the simultaneous estimation of both the clutter mean and variance. The estimated clutter mean and variance allow the actual calculation of both clutter model parameters using a power spectrum analyzer, and a CFAR special purpose processor unit. The power spectrum analyzer is composed of: a spatial frequency demultiplexor, and a four element photodetector array. The special purpose processor is composed of: an A/D converter, a square root calculator, an averaging calculator, a combiner unit, a parameter memory unit, and a threshold calculator unit. The components of the CFAR processor may be implemented in a conventional CFAR processor (when modified by the teachings of the present invention) or in individual electronics components.

12 Claims, 4 Drawing Sheets

OPTICAL MONOPULSE CHIRP PROCESSOR

OPTICAL MONOPULSE CHIRP PROCESSOR STATEMENT OF GOVERNMENT INTEREST

The invention described herein may be manufactured and used by or for the Government for governmental purposes without the payment of any royalty thereon.

BACKGROUND OF THE INVENTION

Constant false alarm rate (CFAR) techniques are frequently utilized in radar receivers to prevent saturation of radar target detection and tracking processors. Target detection is a statistical process and as such requires an accurate characterization of target and clutter statistics for the determination of an optimal CFAR detection threshold. CFAR techniques rely on the adaptive update of receiver detection thresholds to maintain a constant probability of false alarm. The detection threshold must be adaptively updated to accommodate variations in the radar clutter background. Two parameter statistical models are generally required to accurately characterize radar clutter for a wide range of clutter types and conditions. The most commonly utilized clutter models include the lognormal and the Weibull statistical distributions. An accurate description of radar clutter utilizing either of these statistical distributions amounts to the determination of the two model parameters.

The utility of these two parameter models has been limited by a lack of methods for estimating the parameters. Currently, practical CFAR techniques consist of radar resolution cell averaging schemes for the estimation of the clutter mean. These cell averaging schemes utilize an estimated clutter mean and empirically established values of the model "shape" parameter associated with the clutter type to set a detection threshold. In addition, the utilization of clutter mean estimates and the estimation of clutter means from a finite number of clutter samples requires the computation of complex threshold coefficients in the determination of a detection threshold. Inaccuracies in the determination of the clutter mean result in cell averaging CFAR threshold that are larger than the optimal values. The cell averaging CFAR thresholds result in a reduction in the probability of target detection. Ideally, it would be desirable to calculate optimal CFAR thresholds directly from known clutter model parameters. Aspects of the current state-of-the-art in cell averaging CFAR in traditional radar processors are briefly described in the following U.S. Patents, the disclosures of which are incorporated herein by reference:

U.S. Pat. No. 4,586,043 issued to Mary Wolf;

U.S. Pat. No. 4,532,639 issued to Price et al;

U.S. Pat. No. 4,513,286 issued to Irabu;

U.S. Pat. No. 4,293,856 issued to Chressanthis;

U.S. Pat. No. 4,103,301 issued to Evans;

U.S. Pat. No. 3,995,270 issued to Perry et al;

U.S. Pat. No. 3,968,490 issued to Gostin; and

U.S. Pat. No. 3,701,1498 issued to Patton et al.

The above-cited patents all describe radar CFAR processors. Monopulse techniques provide standard methods of accurate angular positioning in radar tracking systems. There remains a need for a monopulse scheme for the collection and processing of clutter samples is presented that allows for the simultaneous estimation of both the clutter mean and variance. The estimated clutter mean and variance should allow the calculation of both clutter model parameters. Knowledge of the clutter model parameters should allow for a simple calculation of the optimal CFAR detection threshold. The present invention is intended to satisfy these needs.

SUMMARY OF THE INVENTION

The present invention is a special purpose monopulse chirp processor that performs real-time adaptive estimates of CFAR detection thresholds for radar tracking systems using a power spectrum analyzer, and a CFAR special purpose processor unit. The power spectrum analyzer is composed of:

a spatial frequency demultiplexor, and a four-element photodetector array. The special purpose processor is composed of:

an A/D converter, a square root calculator, and averaging calculator, a combiner unit, a parameter memory unit, and a threshold calculator unit. The components of the CFAR processor may be implemented in a conventional CFAR processor (when modified by the teachings of the present invention) or in individual electronics components. In operation, the power spectrum analyzer receives sum and difference beam clutter cross sections collected from at least four beams of a phased array radar antenna and receiver system. The power spectrum analyzer outputs four electric signals that represent the square of the clutter returns using the spatial frequency demultiplexor (which separates and processes the four beam in parallel) and the four element sensor array (which converts the four optical output beams of the spatial frequency demultiplexor into their four equivalent transverse electrical signals by photodetecting received optical beams. The A/D converter outputs four digital data streams by processing the four electrical signals from the sensor array. The square root calculator calculates the square root of each of these four digital data streams to produce thereby four digital clutter return measurement signals. The beam combiner combines the four digital clutter return measurement signals for averaging and CFAR detection threshold calculation as described in the above-cited patent of Mary Wolf.

As described in the Wolf patent:

Once the X average clutter value is know, for a Rayleigh distribution estimate of threshold is given by:

$$T = (-LNP)^{1/2} \cdot \frac{2X}{\sqrt{\pi}}.$$

If the distribution is Weibull, $$T = b - \frac{(LNP)}{(a)}.$$

The selection of which estimation method is desired is implemented by the parameter memory unit and CFAR processor.

It is an object of the present invention to provide real-time CFAR detection thresholds for phased array radar systems.

It is another object of the present invention to provide a design for a special purpose optical chirp processor.

These objects together with other objects, features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

The present invention is a special purpose monopulse chirp processor that performs real-time adaptive estimates of the lognormal and Weibull parameters and CFAR thresholds.

Radar clutter is usually characterized statistically by two parameter lognormal or Weibull models. Knowledge of the parameters allows the calculation of detection thresholds in implementing adaptive CFAR receivers. The utilization of two parameter models has been impeded by a lack of methods for estimating the parameters. Presently, CFAR techniques avoid two parameter threshold calculations sand instead rely upon cell averaging schemes that are based upon knowledge of the clutter mean. An optical monopulse chirp processor of the present invention performs real-time adaptive estimates of the lognormal and Weibull paramets and CFAR thresholds.

Figure 1:
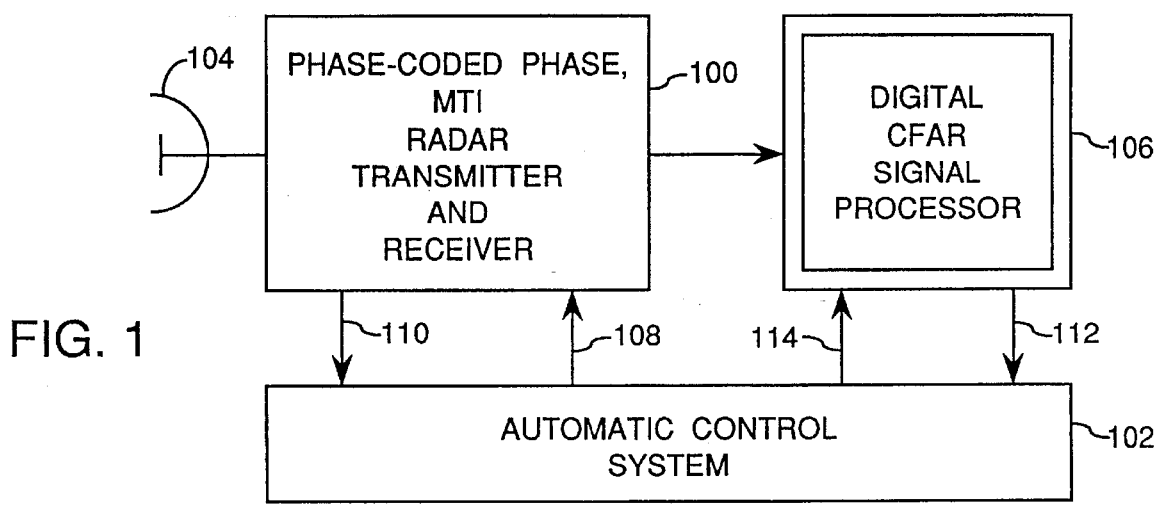
FIG. 1 is a block diagram of a radar system in which the optical CFAR signal processor of the present invention may be deployed.

FIG. 1 is a block diagram of a radar system in which the optical CFAR signal processor of the present invention may be deployed. The system of FIG. 1 includes a phase-coded pulse, MTI radar transmitter and receiver 100, automatic control system 102, scanning antenna 104 and digital CFAR signal processor 106. Automatic control system 102 applies required control signals to radar 100 over interconnection 108, while radar 100 feeds back data signals to automatic control system 102 over interconnection 110. Similarly, automatic control system 102 applies control signals to processor 106 over interconnection 112 and processor 106 feeds back data signals to automatic control system 102 over interconnection 114.

Among the control signals applied to radar 100 from automatic control system 102 over interconnections 108 is a selected serial phase code composed of a predetermined plural number of bits. This predetermined number is equal to or less than a given number 11.

As is known in the radar art, scanning antenna 104 receives echoes of each successive exploratory pulse reflected from targets and also receives some quantity of noise and possibly clutter. As is conventional, the radar receiver includes a front-end, an IF amplifier and a baseband detector. Further, the radar receiver normally is gated by a range gate which is open during a given range interval (selected by control signals from automatic control system 102), for forwarding to the baseband detector only those target echoes which occur during the given range interval. The size of the given range interval (determined by the width of the range gate) is normally dependent upon the maximum range of detection for a given dwell.

The output of the baseband detector of the receiver of radar 100 is applied as an input to digital CFAR signal processor 106. In general, processor 106 includes an MTI canceller, which operates as a bandpass doppler-frequency filter that removes substantially all stationary and slow-moving target signals and also removes substantially all low-frequency noise and clutter present in the output of the baseband detector. The output of the MTI canceller, beside including moving target signals of interest, also includes that portion of the noise and clutter which is within the effective pass-band of the MTI canceller. The MTI canceller is mode dependent.

Included in the control signals applied to processor 106 from automatic control system 102 over interconnection 114 is the same selected serial phase code that is then being used to phase-modulate the transmitted exploratory pulses. Processor 106 also includes a threshold comparator for comparing the output level from the discrimination means to a variable threshold level applied to a processor 106 from automatic control system 102 over interconnection 114. The threshold level is varied in such a manner that an output from the threshold comparator (which applies a data signal to automatic control system 102 over interconnection 112) corresponds to a preselected constant false alarm rate (CFAR). The higher the degree of discrimination of the discrimination means of processor 106, the lower is the absolute level of the threshold required to provide a certain CFAR. Further, the lower the absolute level of the threshold, the less is the effective reduction in sensitivity of the radar receiver, compared to that of an optimum-matched receiver.

Figure 2:
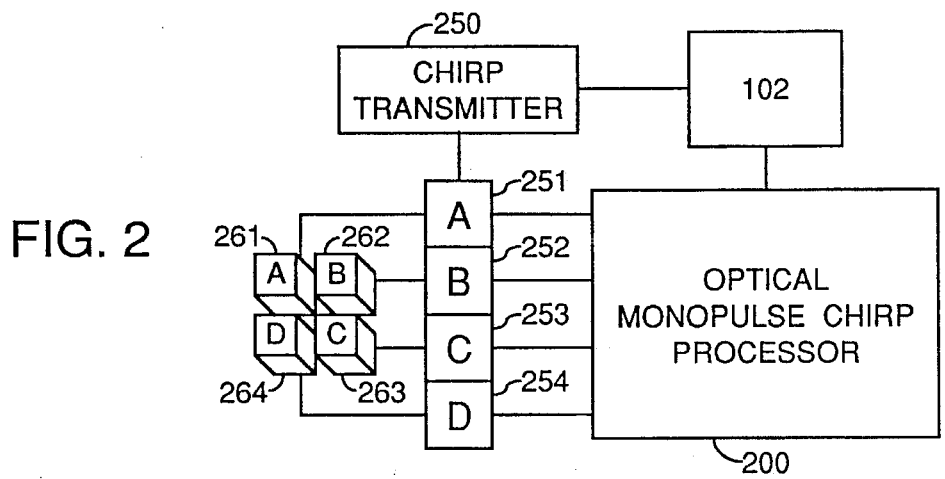
FIG. 2 is an illustrative block diagram of the optical CFAR signal processor of the present invention.
Figure 3:
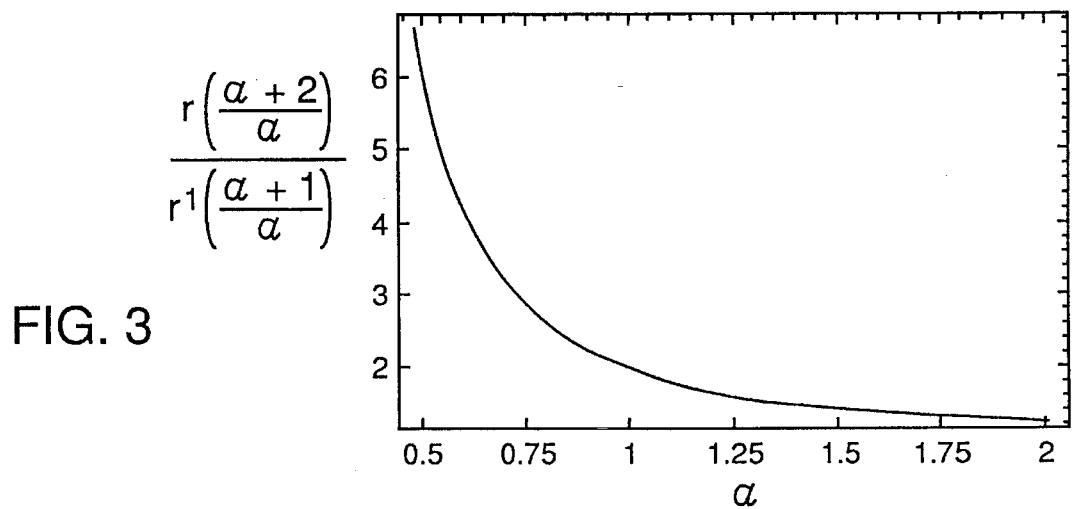
FIG. 3 is a chart of Gamma function ratio as a function of the Weibull shape parameter.

FIG. 2, a four-element monopulse radar system that emits four beams through elements 261–264 from a transmitter 250, and electronically steered by phase shifter 251–254 as controlled by a processor 200. Radar echo return signals that include both target echos and clutter signals are received by the elements 261–264 and conducted into the processor 200.

The most commonly utilized clutter models include the lognormal and the Weibull statistical distributions. An accurate description of radar clutter utilizing either of these statistical distributions amounts to the determination of the two model parameters.

The utility of these two parameter models has been limited by a lack of methods for estimating the parameters. Currently, practical CFAR techniques consist of radar resolution cell averaging schemes for the estimation of the clutter mean. These cells averaging schemes utilize an estimated clutter mean and empirically established values of the model shape: parameter associated with the clutter type to set a detection threshold. In addition, the utilization of clutter mean estimates and the estimation of clutter means from a finite number of clutter samples requires the computation of complex threshold coefficients in the determination of a detection threshold. In addition, the utilization of clutter mean estimates and the estimation of clutter means from a finite number of clutter samples requires the computation of complex threshold coefficients in the determination of a detection threshold. Inaccuracies in the determination of the clutter mean result in cell averaging CFAR threshold that are larger than the optimal values. The cell averaging CFAR thresholds result in a reduction in the probability of target detection. Ideally, it would be desirable to calculate optimal CFAR thresholds directly from known clutter model parameters. Aspects of the current sate-of-the-art in cell averaging CFAR in traditional radar processors are briefly described in the patents cited above.

Monopulse techniques provide standard methods of accurate angular positioning in radar tracking systems. The present invention provides a novel monopulse scheme for the collection and processing of clutter samples is presented that allows for the simultaneous estimation of both the clutter mean and variance. The estimated clutter mean and variance allow the calculation of both clutter model parameters. Knowledge of the clutter model parameters allow for a simple calculation of the optimal CFAR detection threshold. The monopulse scheme utilized frequency agility to collect a large number of independent clutter samples for an accurate estimation of the clutter mean and variance. The clutter samples are collected only from the single; radar resolution cell of interest. The collection of clutter samples from a single radar resolution cell during a single frequency chirped radar pulse eliminates the possibility of the clutter edge effects and large discrete interference that plague cell averaging CFAR techniques.

Two optical implementations of the monopulse chirp processor are presented in section four. Optical implementations are required for the practical collection of the large number of clutter samples required in accurately estimating the clutter mean and variance. The implementations require only optical power or heterodyne spectrum analyzers for the spatial demultiplexing of radar clutter returns from a chirped pulse. Optical spectrum analyzers are the most mature and easily implemented of optical signal processing technologies. The optical heterodyne spectrum analyzer implementation provide for the processing of clutter returns having a significant dynamic range. The optical monopulse chirp processor requires only the four beam responses comprising the sum and difference beams in traditional monopulse tracking systems.

In order to understand the principles of the present invention, consider the following. Radar clutter is usually characterized statistically by two parameter lognormal or Weibull models. Knowledge of the parameters allows the calculation of detection thresholds in implementing adaptive CFAR receivers. CFAR receivers maintain a constant false alarm rate by employing an adaptive threshold that ensures a fixed probability of false alarm given variation in the clutter model. The lognormal model of clutter has a probability distribution given by:

$$f(x) = \begin{cases} \frac{1}{x\sqrt{4\pi \ln \rho}} e^{-(\ln x - x_m)^2/4 \ln \rho} & x \geq 0 \\ 0 & x < 0 \\ \text{or} \\ \frac{1}{ax\sqrt{2\pi}} e^{-(\ln x - b)^2/2a^2} & x \geq 0 \\ 0 & x < 0 \end{cases} \quad (1)$$

where $b = x_m$ (the "median" parameter)

$a = \sqrt{2 \ln \rho}$ $\rho = e^{a^2/2}$ (the "shape" parameter).

The mean and variance of the lognormal probability distribution can be expressed as functions of the model parameters.

$$E[x] = e^{b + a^2/2} \quad (2)$$

$$Var[x] = e^{2b + a^2}(e^{a^2} - 1) \quad (3)$$

Knowledge of the mean and variance of the clutter allow the calculation of the two parameters of the lognormal model.

$$a = \sqrt{\ln\left(\frac{Var[x]}{E^2[x]} + 1\right)} \quad (4)$$

$$b = \ln\left(\frac{E[x]}{e^{a^2/2}}\right) \quad (5)$$

The calculation of the optimal (i.e. minimal) CFAR threshold depends upon the type of detection strategy employed by the receiver. For example, given the parameter of the lognormal clutter model, the optimal CFAR threshold of single pulse linear detection receiver can be computed as a function of the required probability of false alarm and the model parameters.

$$T = x_m e^{\sqrt{4 \ln \rho} \, erf^{-1}(1 - 2P_{fa})} = \frac{E[x]}{\rho} e^{\sqrt{4 \ln \rho} \, erf^{-1}(1 - 2P_{fa})} \quad (6)$$

The optimal CFAR threshold is the minimum value consistent with the requirement of a specific constant probability of false alarm. The probability of detection is maximized for the optimal CFAR threshold. Similar CFAR threshold expressions have been determined for multiple pulse linear detection receivers and binary detection receivers. The threshold expressions for the various detection schemes can all be expressed as functions of the probability of false alarm and the lognormal model parameters.

Cell averaging techniques are frequently utilized to determine the CFAR threshold from an estimated clutter mean. The threshold estimate can be expressed as the product of the estimated clutter mean and a threshold coefficient.

$$T = C(P_{fa}, K, \rho) E[x] = C(P_{fa}, K, \rho)\left(\frac{1}{K} \sum_{i=1}^{K} X_j\right) \quad (7)$$

The clutter mean is estimated from the radar cross section response from a window of range/angle resolution cells surrounding the cell of interest. The clutter model for the cells comprising the average is assumed to be fixed for the duration of the radar response collection within the window. In addition, the clutter samples used in estimating the mean are assumed to be independent and homogeneous in space and time within the cell averaging window. If this condition is not met then clutter edge and large discrete effects may degrade the estimation of the clutter mean. In practice, processing speed and the requirement of a homogeneous clutter model within the window limit the number of cells in the average to sixty-four and in the majority of implementations to thirty-two. The cell averaging CFAR threshold estimates are greater than the optimal CFAR threshold due to inaccuracies in estimating the clutter mean from a finite number of samples. Consequently, the probability of detection is reduced for a fixed signal power to clutter power ratio. The increase in signal to clutter ratio required to maintain the probability of detection for finite clutter sample estimates of the CFAR threshold is known as CFAR loss. The threshold coefficient is generally a complicated and intractable function of the required probability of false alarm, the lognormal model shape parameter, and the number of samples used in estimating the clutter mean. In addition, the shape parameter of the lognormal model Of the actual clutter is unknown and values are utilized that have been determined as characteristic of particular types of clutter from previous CFAR receiver performance. However, as the number of independent clutter samples in the estimate of the clutter mean increases, the threshold coefficient approaches the theoretical minimum.

$$C(P_{fa}, K, \rho) \to \frac{1}{\rho} e^{\sqrt{4 \ln \rho} \, erf^{-1}(1-2P_{fa})} \quad \text{as } K \to \infty \tag{8}$$

A similar development is possible for the two parameter Weibull model. The analogous expressions for the probability distribution, the mean and variance, the model parameters, and the CFAR threshold can be given.

$$f(x) = \begin{cases} \frac{\alpha \ln 2}{x_m} \left( \frac{x}{x_m} \right)^{\alpha-1} e^{-\ln 2 (x/x_m)^2} & x \geq 0 \\ 0 & x < 0 \end{cases} \tag{9}$$

where

Xm (the "median" parameter)

α (the "shape" parameter).

$$E[x] = \frac{x_m}{(\ln 2)^{1/\alpha}} \Gamma\left( \frac{\alpha+1}{\alpha} \right) \tag{10}$$

$$Var[x] = \left( \frac{x_m}{(\ln 2)^{1/\alpha}} \right)^2 \left[ \Gamma\left( \frac{\alpha+2}{\alpha} \right) - \Gamma^2\left( \frac{\alpha+1}{\alpha} \right) \right] \tag{11}$$

The shape parameter for the Weibull model cannot be expressed in closed form but must be determined through the solution of an equation involving gamma functions.

$$\left[ \frac{\Gamma\left( \frac{\alpha+2}{\alpha} \right)}{\Gamma^2\left( \frac{\alpha+1}{\alpha} \right)} \right] = \frac{Var[x]}{E^2[x]} + 1 \quad \text{solve for } \alpha \tag{12}$$

The ratio of gamma functions can be computed and stored in the form of a lookup table or chart as shown in FIG. 2. FIG. 2 is a chart of gamma functions as a function of Weibull parameters. Given the value of the ratio and the lookup table, the shape parameter can be determined.

The median parameter can then be calculated from the shape parameter.

$$x_m = \frac{E[x] (\ln 2)^{1/\alpha}}{\Gamma\left( \frac{\alpha+1}{\alpha} \right)} \tag{13}$$

Again, CFAR thresholds for Weibull clutter models have been determined for various detection strategies. For example, given the parameter of the Weibull clutter the optimal CFAR threshold of single pulse linear detection receiver can be computed as a function of the required probability of false alarm and the model parameters.

$$T = x_m \left[ \frac{\ln(P_{fa}^{-1})}{\ln 2} \right]^{1/\alpha} = E[x] \frac{[\ln(P_{fa}^{-1})]^{1/\alpha}}{\Gamma[1 + (1/\alpha)]} \tag{14}$$

The cell averaging CFAR threshold can be estimated from the clutter mean.

$$T = C(P_{fa}, K, \alpha) E[x] = C(P_{fa}, K, \alpha) \left( \frac{1}{K} \sum_{i=1}^{K} X_j \right), \tag{15}$$

The Weibull clutter threshold coefficient is again a complicated function of the probability of false alarm, the number of clutter samples used in estimating the mean, and the shape parameter. As the number of samples used in estimating the clutter mean increases, the threshold coefficient approaches it minimal value.

$$C(P_{fa}, K, \alpha) \to \frac{[\ln(P_{fa}^{-1})]^{1/\alpha}}{\Gamma[1 + (1/\alpha)]} \quad \text{as } K \to \infty \tag{16}$$

For both the lognormal and Weibull models knowledge of the clutter mean and variance completely characterizes the clutter through the calculated model parameter. In addition, knowing the model parameters allow a simple calculation of the CFAR threshold. Unfortunately, current cell averaging CFAR processor are only capable of estimating the clutter mean. In both cases, the shape parameters cannot be estimated from the clutter returns but are instead fixed and chosen to match the type of clutter from experience.

An ideal radar clutter modeling capability would consist of the instantaneous collection and processing of a substantial number of independent clutter radar cross section samples from the single resolution cell of interest and would allow the estimation of the clutter mean and variance. The estimated clutter mean and variance would allow the simple calculation of the two clutter model parameters through the solution of the simultaneous nonlinear equations previously given. The optimal CFAR threshold could then be calculated from the clutter model parameters.

Figure 4:
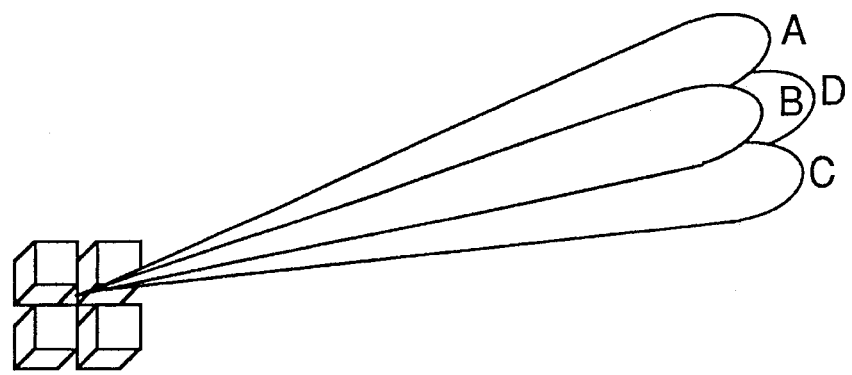
FIG. 4 is an illustration of four monopulse beams emitted by the four elements of FIG. 2.
Figure 5:
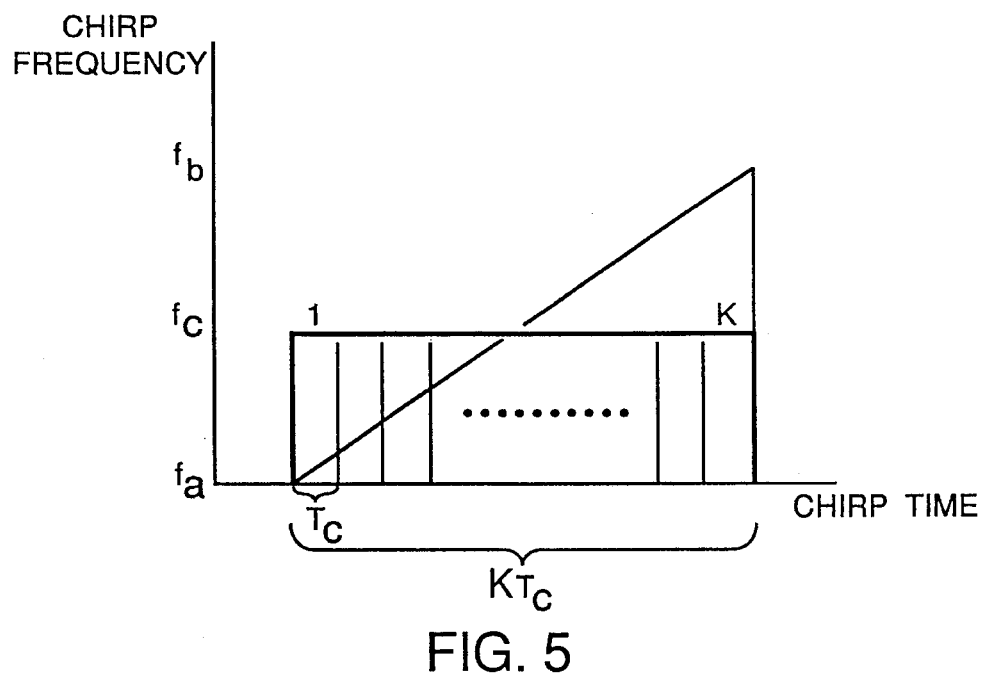
FIG. 5 is a chart of Single clutter resolution cell of monopulse sum and difference beams.
Figure 6:
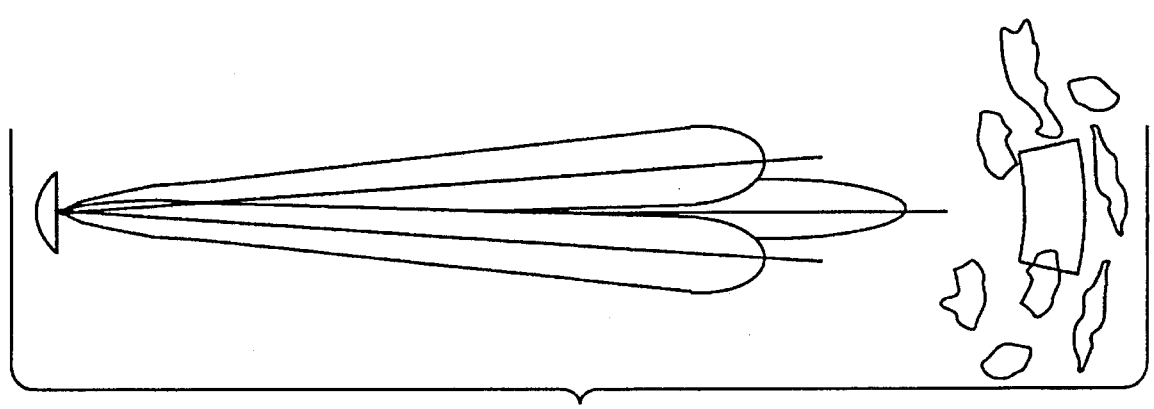
FIG. 6 is a side view of the four beams of FIG. 4 directed from an array to a target.

Consider a monopulse collection of clutter radar cross section at a single radar frequency (FIG. 4). The monopulse collection of clutter samples requires only a homogeneous clutter model over the single resolution cell spanned by the four beams during a single radar pulse. The beamwidths and squint angles of the monopulse beams are set to eliminate any spatial dependence of the clutter response in the four beams comprising the monopulse (FIG. 5). The radar clutter in the four beams have the same clutter model and the samples from the four beams are independent. Each of the four beams in the monopulse returns a clutter radar cross section random variable with identical mean and variance $$X_A, X_B, X_C, X_D \mu, \sigma^2. \tag{17}$$

Figure 7:
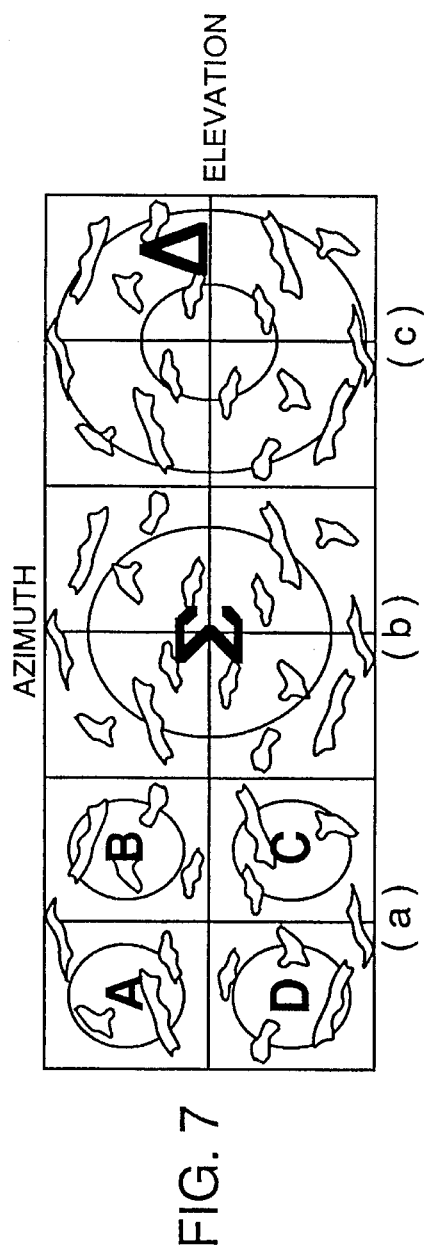
FIG. 7 is an illustration of resolution cell beam combination for: a) Individual monopulse beams, b) Sum beam, c) Difference beam

Characteristic monopulse beam patterns within the radar resolution cell of interest are suggested in FIG. 7. The clutter returns from the four beam are shown as spatially separate (FIG. 7a). The spatial separation provided by the squint angle in amplitude monopulse tracking systems is adjusted to eliminate any statistical dependence in the clutter returns of the four beams. The clutter model is assumed to be homogeneous across the four beams comprising the sum and difference beam patterns (FIGS. 7b, 7c). The monopulse sum beam returns the clutter radar cross section random variable $$X\Sigma = X_A + X_B + X_C + X_D. \tag{18}$$

The monopulse difference beam returns the clutter radar cross section random variable $$X\Delta = X_A + X_B - X_C - X_D. \tag{19}$$

Now, the means of the sum beam and the squared difference beam are given as $$\boxed{E[X_\Sigma] = 4\mu} \tag{20}$$

and $$\boxed{E[X_\Delta^2] = 4\sigma^2} \tag{21}$$

These simple expression for the expected values of the clutter returns of the monopulse sum and difference beams are significant in that they provide a method for simultaneously computing the mean and variance of the clutter model as $$\mu = \frac{E[X_\Sigma]}{4} \quad (22)$$

and $$\sigma^2 = \frac{E[X_\Delta^2]}{4} \quad (23)$$

Now, if the radar clutter returns of the monopulse sum and difference beams could be collected and processed for a range of radar frequencies simultaneously, then the clutter model mean and variance could be estimated as $$\mu \cong \mu_{freq} = \frac{1}{4K} \sum_{i=1}^{K} X_\Sigma(f_i) \quad (24)$$

and $$\sigma^2 \cong \sigma^2_{freq} = \frac{1}{4K} \sum_{i=1}^{K} X_\Delta^2(f_i) \quad (25)$$

where $f_i$ are the radar frequencies used in the K sample averages. The collection of clutter radar cross section samples through a range of radar frequencies is a standard technique utilized to ensure the samples are independent. The frequency variation causes the phase relationships within the distributed clutter to return independent radar cross section samples. The processing of the clutter returns of the monopulse sum and difference beams from a single frequency chirped pulse provides the K samples utilized in the simultaneous estimates of the clutter mean and variance.

The optical monopulse chirp processor is an architecture that implements the ideal clutter collection and processing capability identified in the previous section. The optical monopulse chirp processor requires only the sum and difference beam clutter cross section collected in the four beams of traditional monopulse tracking systems (FIG. 2). The clutter cross section returned in the four beams comprising the monopulse are inputs to optical spectrum analyzers. The optical spectrum analyzers function simply as convenient spatial frequency demultiplexors that allow parallel process of the frequency indexed clutter samples in the four beams from a single frequency chirped pulse. The optical implementation reduces the hardware requirements of the processor and allows for the practical utilization of a much larger number of frequency decorrelated clutter samples in estimating the clutter mean and variance. The collection of a large number of decorrelated clutter samples is required to legitimize using the simple asymptotic form of the threshold coefficients in the CFAR threshold calculation, equations 8 and 16. The two parameters of the clutter models and the CFAR thresholds can then be easily computed from the estimated clutter mean and variance.

The design and operation of optical spectrum analyzers in signal processing is presented in the above-cited patents. Optical spectrum analyzers are the most mature examples of optical signal processing technology. The details of their implementation as components of the optical monopulse chirp processor are known and modified as described above. The optical spectrum analyzers need only provide simultaneous magnitude measurement of an adequate number of frequency decorrelated clutter radar cross section samples. As such, the frequency accuracy of the collected clutter samples and the frequency resolution of the spectrum analyzers are not a primary concern. Consequentially, the detector arrays require only a third the number of elements needed in spectrum analysis. In addition, the fine alignment of the detector array to the spatial frequencies required for accurate frequency measurement is unnecessary. The optical monopulse chirp processor is tolerant of spatial frequency/detector array alignment and could therefore operate in demanding environments. The optical spectrum analyzers require only a total frequency bandwidth consistent with demultiplexing the monopulse chirp clutter returns onto the detector array. In practice, the dynamic range of power spectrum analyzers are generally limited to 40 dB. A dynamic range of over 80 dB is achievable with heterodyne spectrum analyzers. Linear detector arrays consisting of 4096 elements are readily available and acousto-optic cell with time-bandwidth products of 1000–3000 are typical. The number of samples scanned by a chirp of bandwidth W is on the order of the time bandwidth product of the acousto-optic cell.

The power of the monopulse chirp must be calibrated with the radar pulse of the search and/or tracking radar for the correct estimation of the CFAR threshold (FIG. 5). The pulse width of the search/tracking radar is $\tau$ and the frequency of the pulse is $f_c$. If the clutter mean and variance are to be estimated from K frequency demultiplexed samples from a frequency chirped monopulse, then the chirp width in each of the four beams must be $K\tau_c$ where $$\tau_c = \alpha\tau \geq \tau. \quad (26)$$

The frequency chirp is centered on the search/tracking radar pulse frequency. The demultiplexed $\tau_c$ sections of the chirp will return independent clutter samples if adjacent sections maintain a frequency separation greater than $1/2\tau_c$. The sections of the chirp are centered on $$f_i = f_a + \left( i + \frac{1}{2} \right) \frac{1}{2\tau_c} \quad i = 1,2,3 \ldots K. \quad (27)$$

The required bandwidth of the chirp is $$W = f_b - f_a = (K+1) \frac{1}{2\tau_c} = (K+1) \frac{1}{2\alpha\tau} \quad (28)$$

The frequency requirements of the chirp can be traded against the chip width to accommodate the capabilities of the search/tracking radar.

Figure 8:
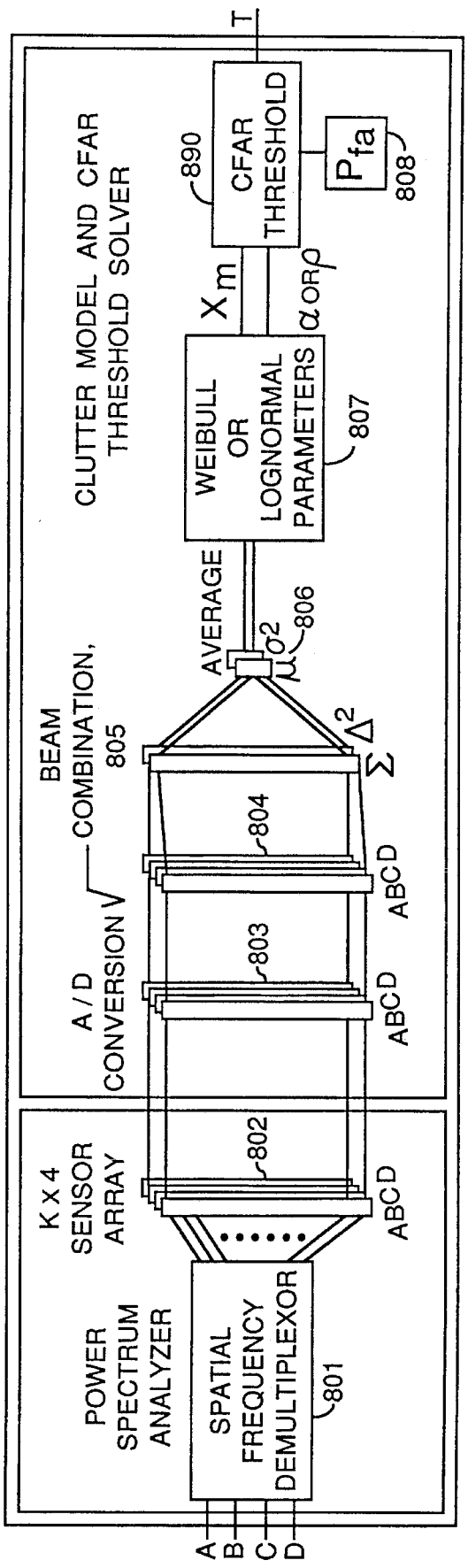
FIGS. 8 and 9 are detailed illustrations of an optical monopulse chirp processor used with radar systems respectively for Power spectrum analyzer implementation, and Heterodyne spectrum analyzer implementation.
Figure 9:
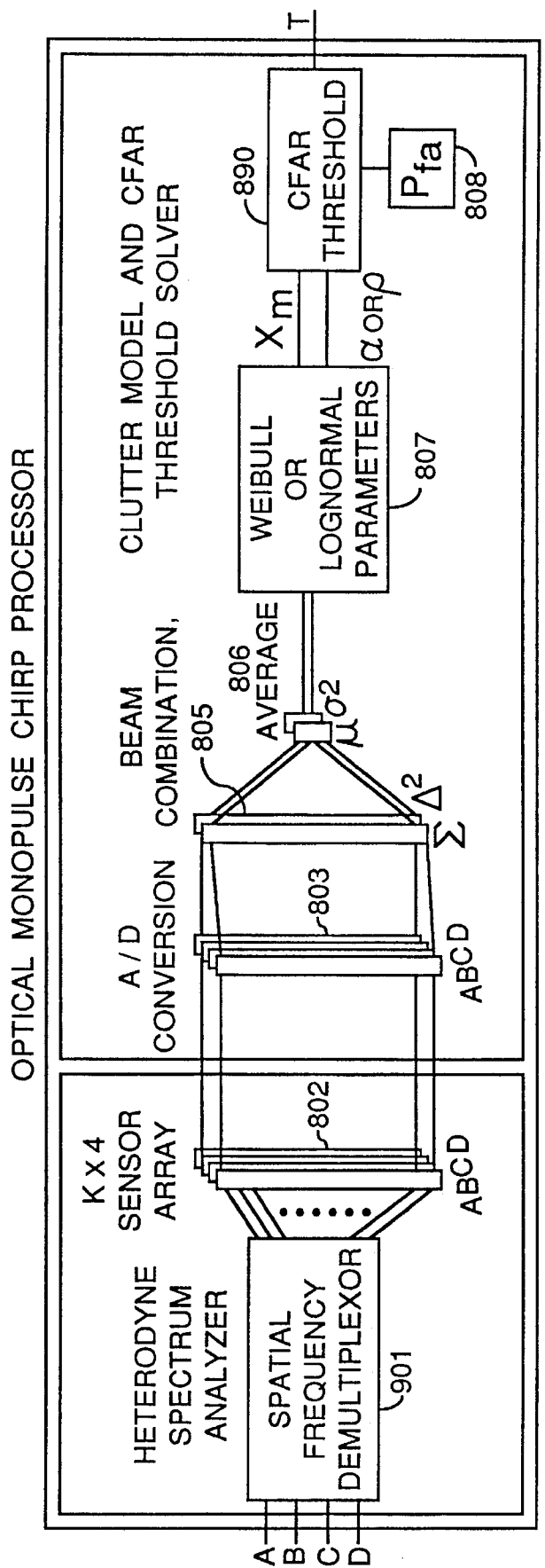

FIGS. 8 and 9 are detailed illustrations of an optical monopulse chirp processor used with radar systems respectively for power spectrum analyzer implementation and heterodyne spectrum analyzer implementation.

The first implementation utilizes optical power spectrum analyzers as spatial frequency demultiplexors (FIG. 8). Power spectrum analyzers are the simplest to implement. The power spectrum analyzers provide the square of the clutter returns as outputs from its photodetector array, 802. The power spectrum analyzer implementation requires that the square roots of the digitized clutter samples be computed. The second optical implementation of the monopulse chirp processor utilizes heterodynes spectrum analyzers as spatial frequency demultiplexors (FIG. 9). The heterodyne implementation provides significantly greater dynamic range in processing clutter radar cross section returns. The heterodyne spectrum analyzers provide the magnitude of the clutter returns as outputs from its photodetector arrays. The analog outputs of the power and heterodyne spectrum analyzers are converted to digital format prior to squaring the difference beam samples and averaging the sum and difference beam returns. The average of the clutter causes the phase relationships within the distributed clutter to return independent radar cross section samples. The processing of the clutter returns of the monopulse sum and difference beams from a single frequency chirped pulse provides the K samples utilized in the simultaneous estimates of the clutter mean and variance.

The optical monopulse chirp processor is an architecture that implements the ideal clutter collection and processing capability identified in the previous section. The optical monopulse chirp processor requires only the sum and difference beam clutter cross section collected in the four beams of traditional monopulse tracking systems (FIG. 2). The clutter cross section returned in the four beams comprising the monopulse are inputs to optical spectrum analyzers. The optical spectrum analyzers function simply as convenient spatial frequency demultiplexors that allow parallel processing of the frequency indexed clutter samples in the four beams from a single frequency chirped pulse. The optical implementation reduces the hardware requirements of the processor and allows for the practical utilization of a much larger number of frequency decorrelated clutter samples in estimating the clutter mean and variance. The collection of a large number of decorrelated clutter samples is required to legitimize using the simple asymptotic form of the threshold coefficients in the CFAR threshold calculation, equations 8 and 16. The two parameters of the clutter models and the CFAR thresholds can then be easily computed from the estimated clutter mean and variance.

The design and operation of optical spectrum analyzers in signal processing is presented in the above-cited patents. Optical spectrum analyzers are the most mature examples of optical signal processing technology. The details of their implementation as components of the optical monopulse chirp processor are known and modified as described above. The optical monopulse chirp processor of FIG. 8 is divided into two major sections: the power spectrum analyzer section, and the digital processor section. The power spectrum analyzer section consists of the spatial frequency is composed of:

a spatial frequency demultiplexor 801, and a four element photodetector array 802. The special purpose processor is composed of: an A/D converter 803, a square root calculator 804, an averaging calculator 806, a combiner unit 805, a parameter memory unit 807, and a threshold calculator unit 890. The components of the CFAR processor may be implemented in a conventional CFAR processor (when modified by the teachings of the present invention) or in individual electronic components. In operation, the power spectrum analyzer receives sum and difference beam clutter cross sections collected from at least four beams of a phased array radar antenna and receiver system. The power spectrum analyzer outputs four electric signals that represent the square of the clutter returns using the spatial frequency demultiplexor 801 (which separates and processes the four beams in parallel) and the four element sensor array 802 (which converts the four optical output beams of the spatial frequency demultiplexor into their four equivalent transverse electrical signals by photodetecting received optical beams.

The A/D converter 803 outputs four digital data streams by processing the four electrical signals from the sensor array. The square root calculator 804 calculates the square root of each of these four digital data streams to produce thereby four digital clutter return measurement signals. The beam combiner 805 combines the four digital clutter return measurement signals for averaging and CFAR detection threshold calculation as described in the above-cited patent of Mary Wolf.

As described in the Wolf patent: once the X average clutter value is known, for a Rayleigh distribution estimate of threshold is given by:

$$T = (-LNP)^{1/2} \cdot \frac{2X}{\sqrt{\pi}}.$$

If the distribution is Weibull, $$T = b - \frac{(LNP)}{a}.$$

The selection of which estimation method is desired is implemented by the parameter memory unit 807 and CFAR processor 890.

The systems of FIGS. 8 and 9 use many common elements as described by the following U.S. Patents for Optical spectrum analyzer systems, the disclosures of which are incorporated herein by reference:

U.S. Pat. No. 5,412,469 issued to Squillman;
U.S. Pat. No. 5,233,405 issued to Wildnaner et al;
U.S. Pat. No. 5,066,126 issued to Hatori;
U.S. Pat. No. 4,464,624 issued to Osterwalder;
U.S. Pat. No. 3,883,803 issued to Burns et al; and
U.S. Pat. No. 3,636,255 issued to Gaddy et al.

In FIG. 8, the spatial frequency demultiplexor 801 processes the four beams (A, B and C) received by the four radar elements of FIG. 2 to produce four optical beams for a sensor array 802. In other words, every radar element in a phased array radar system will have its received signal processed separately by the spatial frequency demultiplexor and a separate photodetector element in a sensor array 802.

As mentioned above, the power spectrum analyzer provides the square of the clutter returns as outputs from its photodetector arrays. The power spectrum analyzer implementation requires that the square roots of the digitized clutter samples be computed. This is accomplished by converting the output of the sensor array 802 into a digital signal, using the A/D converter 803, and then using a unit 804 to calculate the square root. The beams are then combined by the combiner 805 and averaged 806 for CFAR detection threshold calculation as described above.

In the system of FIG. 9, the optical implementation of the monopulse chirp processor utilizes a heterodynes spectrum analyzer as a spatial frequency demultiplexor 901. The heterodyne implementation provides significantly greater dynamic range in processing clutter radar cross section returns. The heterodyne spectrum analyzers provide the magnitude of the clutter returns as outputs from its photodetector arrays. The analog outputs of the power and heterodyne spectrum analyzers are converted to digital format 803 prior to squaring the difference beam samples and averaging 806 the sum and difference beam returns. The optical spectrum analyzers need radar cross section returns of the sum and difference beams for either implementation are given as $$\frac{\tau}{4\tau_c K} \sum_{i=1}^{K} X_\Sigma(f_i) \cong \mu \tag{29}$$

and $$\frac{\tau^2}{4\tau_c^2 K} \sum_{i=1}^{K} X_\Delta^2(f_i) \cong \sigma^2. \tag{30}$$

The averages are calibrated to accommodate the utilized radar pulse and chirp widths. The illustrations of the optical monopulse chirp processor utilizes arrays in the microprocessor to suggest the possibilities for parallel implementations of the computations after the A/D converters. The electronic computations involved in the clutter mean and variance estimation could be sequentially implemented and accumulated for averaging.

The clutter mean and variance estimates from either implementation are supplied to the clutter model parameter and CFAR threshold solver. The clutter model parameters and CFAR thresholds are determined using equations 4, 5 and 6 for the lognormal model or equations 12, 13 and 14 for the Weibull model.

Real-time two-parameter radar clutter modeling is now practical in radar remote sensing and target detection environments. Two optical implementations of the monopulse chirp processor have been presented that provide for the real-time estimation of the clutter variance as well as the clutter mean. The estimated clutter mean and variance allow the calculation of both lognormal and Weibull clutter model parameters. The determination of the clutter model parameters allow the simple calculation of CFAR receiver threshold for a wide variety of detection strategies. The monopulse scheme collects clutter samples from the single radar resolution cell of interest thereby eliminating clutter model edge effects and large discrete interference associated with current cell averaging CFAR processors. The requirement of a homogeneous clutter model over a single resolution cell during a single chirped radar pulse is a more realistic condition than the homogeneous clutter window requirements of current cell averaging CFAR processors. The optical monopulse chirp processor could be easily integrated into existing traditional monopulse tracking and modern multiple beam forming phased array systems.

The current implementations of the optical monopulse chirp processor are designed to operating within a target free radar resolution cell. Strategies for modifying the optical monopulse chirp processor architecture to accommodate clutter model parameter and CFAR threshold estimation with a target present within the radar resolution cell are currently under investigation. In addition, the optical monopulse chirp processor has direct application for clutter modeling and CFAR threshold determination within analogous chirped monopulse sonar environments.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. An optical processor system for use with a phased array radar system for calculating a detection threshold using radar echo return signals which contain clutter components from at least four antenna elements of said phased array radar system, wherein said optical processor system comprises:

a power spectrum analyzer unit which receives and processes the radar echo return signals of said antenna elements of said phased array radar system to output thereby a set of transverse electric signals that represent a square of the clutter components of the radar echo return signals; and a means for digitally calculating a detection threshold from the set of transverse electric signals produced by the power spectrum analyzer.

2. An optical processor system, as defined in claim 1, wherein said power spectrum analyzer unit comprises:

a spatial frequency multiplexor unit which receives and processes the radar echo return signals of said antenna elements to output thereby a set of optical beams which each represent the square of the clutter component received by a single antenna element; and a set of optical photodetectors in a sensor array which photoelectrically convert said set of optical beams into said set of transverse electric signals for said digitally calculating means.

3. An optical processor system, as defined in claim 1, wherein said means for digitally calculating said detection threshold comprises:

a means for converting said set of transverse electric signals from said power spectrum analyzer unit into discrete sets of digital data streams;

a means for deriving a set of digital clutter measurement signals from said discrete set of digital data streams from said converting means;

a means for combining said set of digital clutter measurement signals from said deriving means into a combined clutter measurement signal;

a means for producing an average clutter measurement signal from the combined clutter measurement signal; and a CFAR digital processor system which calculates said detection threshold from said average clutter measurement signal from said producing means.

4. An optical processor system, as defined in claim 2, wherein said means for digitally calculating said detection threshold comprises:

a means for converting said set of transverse electric signals from said power spectrum analyzer unit into discrete sets of digital data streams;

a means for combining said set of digital clutter measurement signals from said deriving means into a combined clutter measurement signal;

a means for producing an average clutter measurement signal from the combined clutter measurement signal; and a CFAR digital processor system which calculates said detection threshold from said average clutter measurement signal from said producing means.

5. An optical processor system, as defined in claim 3, wherein said CFAR digital processor system comprises:

a memory means which is capable of producing an output signal by storing and outputting said average clutter measurement signal from said producing means along with a set of detection threshold formulas for calculating said detection threshold with Raleigh distribution and with Weibull distribution; and a microprocessor element which calculates and outputs the detection threshold using the output signal of said memory means.

6. An optical processor system, as defined in claim 4, wherein said CFAR digital processor system comprises:

a memory means which is capable of producing an output signal by storing and outputting said average clutter measurement signal from said producing means along with a set of detection threshold formulas for calculating said detection threshold with Raleigh distribution and with Weibull distribution; and a microprocessor element which calculates and outputs the detection threshold using the output signal of said memory means.

7. An optical processor system for use with a phased array radar system for calculating a detection threshold using radar echo return signals which contain clutter components from at least four antenna elements of said phased array radar system, wherein said optical processor system comprises:

a heterodyne spectrum analyzer unit which receives and processes the radar echo return signals of said antenna elements of said phased array radar system to output thereby a set of transverse electric signals that represent a magnitude of the clutter components of the radar echo return signals; and a means for digitally calculating a detection threshold from the set of transverse electric signals produced by the heterodyne spectrum analyzer.

8. An optical processor system, as defined in claim 7, wherein said heterodyne spectrum analyzer unit comprises:

a spatial frequency multiplexor unit which receives and processes the radar echo return signals of said antenna elements to output thereby a set of optical beams which each represent the magnitude of the clutter component received by a single antenna element; and a set of optical photodetectors in a sensor array which photoelectrically convert said set of optical beams into said set of transverse electric signals for said digitally calculating means.

9. An optical processor system, as defined in claim 7, wherein said means for digitally calculating said detection threshold comprises:

a means for converting said set of transverse electric signals from said heterodyne spectrum analyzer unit into discrete sets of digital data streams;

a means for combining said discrete set of digital data streams clutter measurement signals from said converting means into a combined clutter measurement signal;

a means for producing an average clutter measurement signal from the combined clutter measurement signal; and a CFAR digital processor system which calculates said detection threshold from said average clutter measurement signal from said producing means.

10. An optical processor system, as defined in claim 8, wherein said means for digitally calculating said detection threshold comprises:

a means for converting said set of transverse electric signals from said heterodyne spectrum analyzer unit into discrete sets of digital data streams;

a means for combining said discrete set of digital data stream clutter measurement signals from said converting means into a combined clutter measurement signal;

a means for producing an average clutter measurement signal from the combined clutter measurement signal; and a CFAR digital processor system which calculates said detection threshold from said average clutter measurement signal from said producing means.

11. An optical processor system, as defined in claim 9, wherein said CFAR digital processor system comprises:

a memory means which is capable of producing an output signal by storing and outputting said average clutter measurement signal from said producing means along with a set of detection threshold formulas for calculating said detection threshold with Raleigh distribution and with Weibull distribution; and a microprocessor element which calculates and outputs the detection threshold using the output signal of said memory means.

12. An optical processor system, as defined in claim 10, wherein said CFAR digital processor system comprises:

a memory means which is capable of producing an output signal by storing and outputting said average clutter measurement signal from said producing means along with a set of detection threshold formulas for calculating said detection threshold with Raleigh distribution and with Weibull distribution; and a microprocessor element which calculates and outputs the detection threshold using the output signal of said memory means.

* * * * *